(12) United States Patent
Bugescu et al.

(10) Patent No.: US 7,931,001 B2
(45) Date of Patent: Apr. 26, 2011

(54) VALVE TRAIN OF AN INTERNAL COMBUSTION ENGINE HAVING A CYLINDRICAL VALVE TAPPET

(75) Inventors: Florin Bugescu, Canton, MI (US); Anna Strehlau, Windsor, CA (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 300 days.

(21) Appl. No.: 12/279,390

(22) PCT Filed: Feb. 2, 2007

(86) PCT No.: PCT/EP2007/051010
§ 371 (c)(1),
(2), (4) Date: Aug. 14, 2008

(87) PCT Pub. No.: WO2007/096241
PCT Pub. Date: Aug. 30, 2007

(65) Prior Publication Data
US 2009/0007871 A1 Jan. 8, 2009

Related U.S. Application Data

(60) Provisional application No. 60/775,489, filed on Feb. 22, 2006.

(51) Int. Cl.
*F01L 1/14* (2006.01)
(52) U.S. Cl. ............... 123/90.52; 123/90.55; 123/90.48; 74/569
(58) Field of Classification Search ............... 123/90.55, 123/90.16, 90.48, 90.52; 74/569
See application file for complete search history.

(56) References Cited

U.S. PATENT DOCUMENTS

| 2,749,162 | A | 6/1956 | Humphrey |
| 2,813,732 | A | 11/1957 | Hird |
| 2,997,350 | A | 8/1961 | Gerner |
| 5,307,769 | A | 5/1994 | Meagher et al. |
| 6,405,699 | B1 | 6/2002 | Church |
| 6,578,535 | B2 | 6/2003 | Spath et al. |
| 6,595,174 | B2 | 7/2003 | Schnell |
| 6,997,154 | B2 | 2/2006 | Geyer et al. |
| 2005/0120989 | A1 | 6/2005 | Geyer et al. |

FOREIGN PATENT DOCUMENTS

| DE | 4002583 | 5/1991 |
| DE | 19804952 | 8/1999 |
| DE | 19844202 | 3/2000 |
| DE | 19915531 | 10/2000 |
| DE | 10204672 | 8/2003 |
| DE | 10212522 | 10/2003 |
| EP | 1526255 | 4/2005 |
| JP | 06193620 | 7/1994 |

*Primary Examiner* — Zelalem Eshete
(74) *Attorney, Agent, or Firm* — Volpe and Koenig, P.C.

(57) ABSTRACT

The invention proposes a push-rod valve train having an adjustable valve tappet (1). This has an outer part (2a, 2b), an inner part (8) and a lost-motion spring (10), which forces the inner part (8) towards a relative position, at least one retainer ring (23), which is fixed in an annular groove (21) of the outer part (2a, 2b) and which interacts with a stop face (22) of the inner part (8), being provided for fixing the relative position, said retainer ring having lugs (28) extending radially inwards and separated by a fitting gap (27). In this the free movement of the valve push rod (15) relative to the lugs (28) is assured by the provision of a torsional locking means (30a, 30b), which serves to fix the radial position of the fitting gap (27) inside the annular groove (21).

7 Claims, 3 Drawing Sheets

VALVE TRAIN OF AN INTERNAL COMBUSTION ENGINE HAVING A CYLINDRICAL VALVE TAPPET

FIELD OF THE INVENTION

The invention relates to a valve train of an internal combustion engine having a substantially cylindrical valve tappet, which for the variable transmission of a cam lift to a valve push rod inclined in relation to the longitudinal axis of the valve tappet is of adjustable design in that the valve tappet has an outer part, secured against torsion about the longitudinal axis and with a cam follower face, an inner part, displaceably supported in a longitudinal bore in the outer part and acting on the valve push rod, together with a lost motion spring, which is held inside the longitudinal bore between the outer part and the inner part and which forces the inner part towards an axial position relative to the outer part, in which the inner part and the outer part have seats aligning with one another. Here, in one of the seats, one or more coupling means, displaceable in the direction of the other seat, are arranged for coupling the inner part to the outer part in the relative position, and at least one retainer ring, which is fixed in an annular groove of the longitudinal bore and interacts with an axial stop face of the inner part, and which on its inner circumference has lugs with fitting holes, extending radially inwards and separated by a fitting gap, is provided for fixing the relative position.

BACKGROUND OF THE INVENTION

Such valve trains are basically known in the form of push rod valve trains in high-capacity internal combustion V-engines. Here the cam lifts of a camshaft supported in the engine block of the internal combustion engine in proximity to the crankshaft are first translated into a longitudinal movement of the valve tappets, which are likewise supported in the engine block and generally take the form of low-friction roller tappets. The reciprocating movement of the valve tappets is then transmitted by valve push rods, which actuate rocker arms supported in the cylinder head of the internal combustion engine, to the gas exchange valves associated with the valve tappets.

In such internal combustion engines a cylinder cut-off represents a highly effective measure for reducing the fuel consumption and in design terms is moreover particularly easy to implement. The requisite shutdown of the gas exchange valves of the cylinders cut off is achieved through the use of adjustable valve tappets having an outer part and an inner part, which can be coupled together as necessary by coupling means so as to permit a variable transmission of the cam lift to the valve push rod. Whilst the patent literature contains various proposals for the design of such valve tappets, a valve train regarded as generic and used in series production was demonstrated to experts at the 26$^{th}$ Vienna International Engine Symposium and documented in the "VDI Progress Reports", volume series 12, No. 595. The valve tappet is in this case designed so that the inner part, displaceably supported in the longitudinal bore in the outer part, is forced by means of a lost-motion spring assembly arranged inside the longitudinal bore towards two superimposed retainer rings fixed in an annular groove of the outer part. In addition to their function as a device for securing the inner part during assembly and transport of the valve tappet, the retainer rings interacting with a stop face of the inner part serve, in a known manner, to ensure that the seats for the coupling means, running in the inner part and the outer part, always align with one another during the cam base circle phase.

As is also disclosed in some detail in DE 102 04 672 A1, two retainer rings, of which one is taken from a type assortment of retainer rings of variable thickness, are provided for ease of assembly in adjusting the closely toleranced coupling play between the coupling means and the seats. Such retainer rings for bores, which will also be known to the person skilled in the art under the trade name "Seeger ring", have lugs separated by a fitting gap with fitting holes for a fitting tool. The lugs extending radially inwards on the inner circumference of the retainer ring mean that the clear space between the lugs and the valve push rod is significantly less than in the remaining area of the inner circumference. Since the valve push rod is generally fitted inclined in relation to the longitudinal axis of the valve tappet, however, and furthermore performs a swiveling movement superimposed on this inclination during operation of the internal combustion engine, the maintenance of the absolutely essential free movement between the valve push rod and the lugs of the retainer ring presents design problems. This applies, in particular, with regard to the valve tappet in the deactivated state, in which the inner part sinks into the outer part and the valve push rod is displaced in parallel in the direction of the retainer rings. In conjunction with unavoidable component tolerances, this interaction may lead to unwanted restrictions, particularly with regard to the diameter of the valve tappet and valve push rod, the inclination of the valve push rod and its operational swiveling range in relation to the longitudinal axis of the valve tappet and the height of the cam lift to be deactivated.

An interruptible valve tappet in which this problem does not occur is set forth in DE 102 12 522 A1. The retainer ring proposed therein, however, is a "Seeger ring" for shafts, which is fixed not in an inner annular groove of the outer part but in an outer annular groove of the inner part and which primarily serves to support a spring seating for the lost-motion spring, which runs around the inner part in the area of an end section of the valve tappet facing the valve push rod. In this respect the lugs of this retainer ring do not extend radially inwards on its inner circumference but radially outwards on its outer circumference. Consequently, with such a valve tappet there is also no risk of the valve push rod colliding with the lugs of the retainer ring.

OBJECT OF THE INVENTION

The object of the invention is therefore to avoid the problems outlined and hence to create a valve train of the aforementioned type without the restrictions described. Accordingly, the valve tappet is to be further developed so that even with modified design parameters, including, in particular, the inclination of the valve push rod in relation to the longitudinal axis of the valve tappet and the height of the cam lift to be deactivated, the free movement of the valve push rod in relation to the lugs of the retainer ring is assured even in the most unfavorable component tolerance situations.

SUMMARY OF THE INVENTION

According to the invention this object is achieved in that free movement of the valve push rod relative to the lugs is assured by the provision of a torsional locking means, which torsional locking means serves to fix the radial position of the fitting gap inside the annular groove. The fact that the torsional locking ring(s) is/are radially fixed in relation to the likewise torsionally locked outer part of the valve tappet, thereby also precluding any independent twisting during operation of the internal combustion engine, means that the lugs extending radially inwards in the direction of the valve push rod can be fixed at an angular position, which is non-critical for the free movement of the valve push rod in relation to the lugs.

The position of the fitting gap should appropriately be fixed basically perpendicular to a plane defined by the longitudinal axis of the valve tappet and the longitudinal axis of the valve push rod. In a further development of the invention, the torsional locking means comprises a longitudinal groove in the outer part, which proceeding from an end face of the outer part facing the valve push rod intersects the annular groove, and a projection formed onto the retainer ring and extending radially outwards from the outer circumference thereof, and interlocking radially in the longitudinal groove. A torsional locking means designed in this way is associated with only a minimal additional manufacturing cost, since only one additional longitudinal groove has to be incorporated into the outer part, whilst the projection on the usually punched retainer ring may be regarded as cost-neutral. In order to eliminate the expense and the risk of error in fitting the retainer ring correctly with reference to an upper side and an underside, the projection may be arranged diametrically opposite the fitting gap.

Alternatively, the torsional locking means may also take the form of a torsional locking element, preferably a pin or a rivet, projecting radially in the annular groove and running inside the fitting gap, said torsional locking element being fixed by force closure and/or interlock in a transverse hole of the outer part opening into the annular groove. This on the one hand dispenses with the notch effect, originating from the aforementioned longitudinal groove and mechanically weakening the outer part, and on the other it means that standard commercial retainer rings without the additional projection can be used.

In a preferred development of the invention the valve tappet is supported in a locating space of a tappet guide track so that it is displaceable in the direction of the longitudinal axis of the valve tappet. The locating space has parallel-spaced flats positively interlocking with key faces of the outer part, the torsional locking means being arranged essentially symmetrically about a middle plane of the outer part, to which middle plane the key faces run parallel. Positioning the longitudinal groove or the transverse hole in the outer part outside the flats eliminates the mechanical weakening of the outer part and the associated risk of cracking in the area of the flats having a reduced wall thickness.

Where the torsional locking means takes the form of the retainer ring projection interlocking in the longitudinal groove of the outer part, the projection may furthermore extend beyond the outer circumferential surface of the outer part and engage so that it is longitudinally moveable in a recess of the tappet guide track running in the locating space in the direction of the longitudinal axis of the valve tappet. The additional radial interlock thereby produced between the valve tappet and the tappet guide track may be essential when the valve tappet has to be fitted into the tappet guide track in precisely one angular position, and not even an angular position turned through 180° in relation thereto. This is the case, for example, when the valve tappet has to be aligned radially in relation to a hydraulic fluid gallery which intersects the tappet guide and serves to supply the hydraulic valve clearance adjusting device or to actuate the coupling means. Another possibility for incorrect fitting of the valve tappet, which can be eliminated by the radially protruding projection of the retainer ring, lies in incorrect insertion of the adjustable valve tappet into an adjacent locating space of the same tappet guide track for a conventional, non-adjustable valve tappet. For example, tappet guide tracks of V8-type internal combustion engines with a conventional firing order accommodate four valve tappets, which are adjustable in pairs or of conventional design and naturally always have to be fitted into the tappet guide track in the correct position and with the correct alignment.

Finally, two congruent, superimposed retainer rings may be fitted into the annular groove, the retainer ring in direct contact with the stop face of the inner part and the overlying retainer ring being taken from a type assortment of retainer rings of variable thickness. As already mentioned at the outset, the use of two superimposed retainer rings is especially appropriate for the highly precise and reproducible adjustment of the coupling play during fitting of the valve tappet. Here, in a pre-assembly stage, a retainer ring of constant thickness is fitted in order to determine the required thickness of the second retainer ring according to the coupling play to be set, without the need for costly individual gauging of the relevant component dimensions. In a second assembly stage the second retainer ring is then taken from a type assortment of retainer rings of variable thickness.

BRIEF DESCRIPTION OF THE DRAWINGS

Further features of the invention will be apparent from the following description and the drawings, in which exemplary embodiments of the invention are represented in simplified form and in which.

DETAILED DESCRIPTION OF THE DRAWINGS

Figure 1:
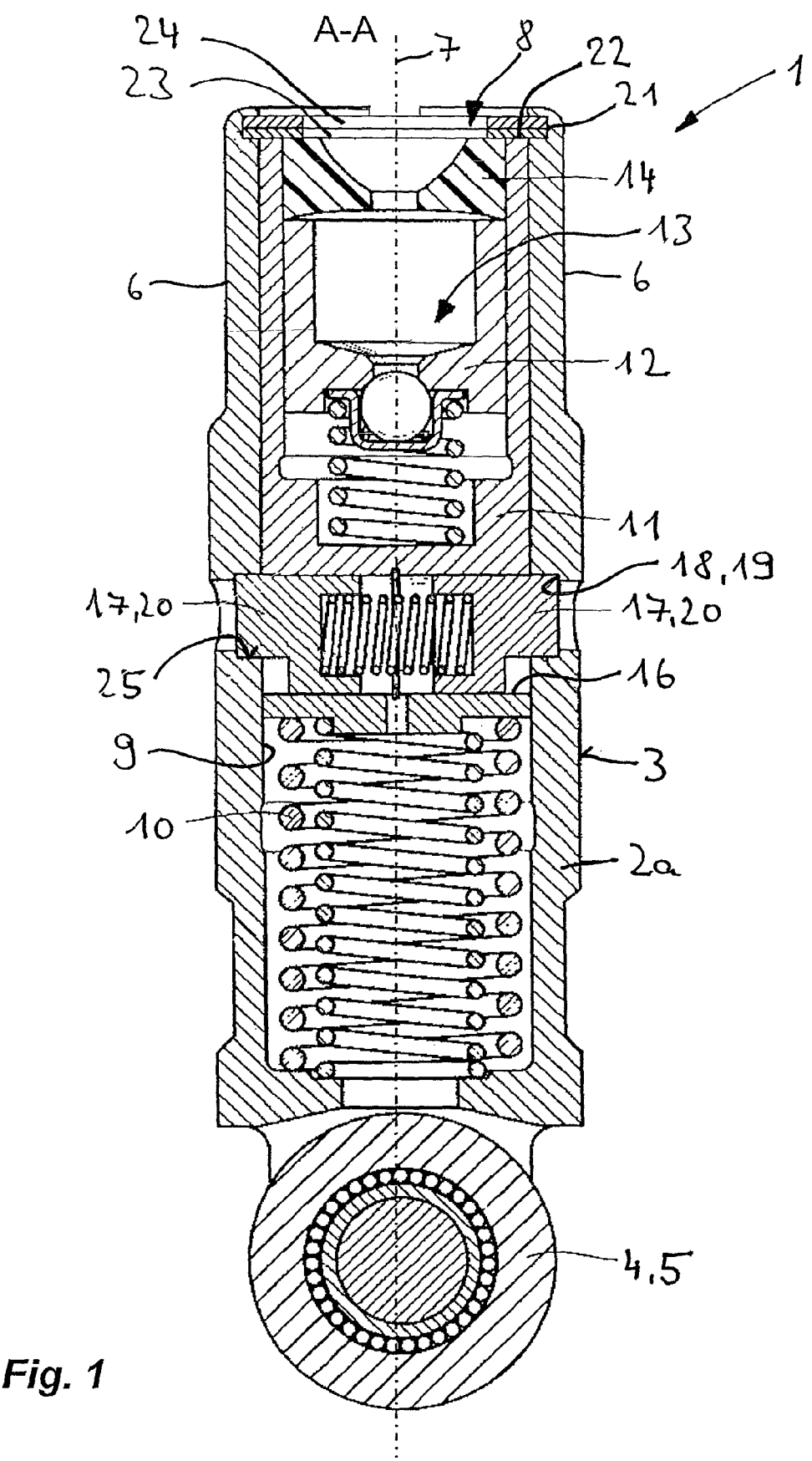
FIG. 1 shows a longitudinal section through a valve tappet according to a first design variant of the invention.
Figure 2:
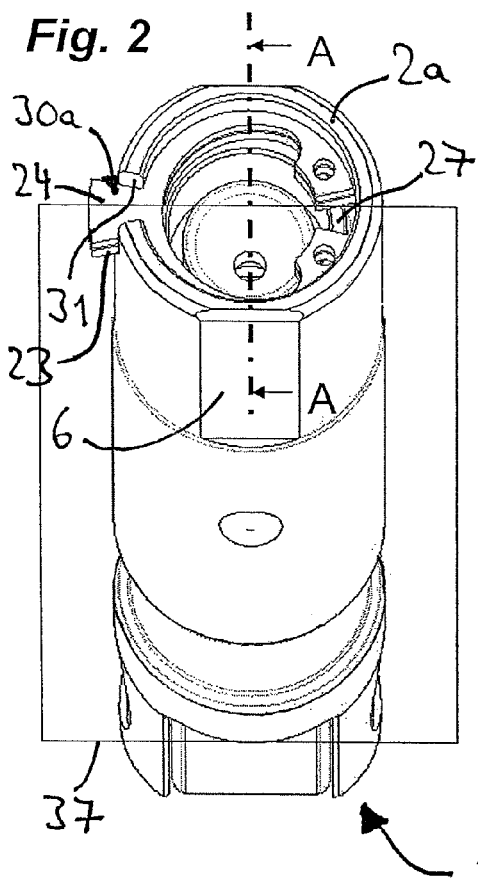
FIG. 2 shows a perspective top view of the valve tappet in FIG. 1.

FIG. 1 shows a valve tappet 1 of a valve train of an internal combustion engine according to the longitudinal section A-A in FIG. 2. The valve tappet 1 is of adjustable design for the variable transmission of a cam lift and for this purpose has a substantially cylindrical outer part 2a, the outer cylindrical surface 3 of which is supported allowing it to slide in a tappet guide (not shown) of the internal combustion engine, and which for the radial alignment of a cam follower face 5 in the form of a low-friction roller 4 is secured by means of key faces 6 against torsion about its longitudinal axis 7. An inner part 8 of the valve tappet 1 comprises, as a sub-assembly, an inner housing 11, supported so that it is displaceable in a longitudinal bore 9 of the outer part 2a against the force of a lost-motion spring 10 and having a pressure piston 12 of a hydraulic valve clearance adjusting device 13; a piston upper part 14 adjoining the pressure piston 12 for the articulated support of a valve push rod 15 of the valve train (see FIG. 3), and hydraulically actuatable coupling means 17, acted upon by a spring force in a seat 16 of the inner housing 11, for coupling the inner part 8 to the outer part 2a as a function of the operating point. A controlled adjustment of the coupling state is possible only during a load-free cam base circle phase and with the inner part 8 in a position relative to the outer part 2a in which the seat 16 of the inner housing 11 aligns with a seat 19 in the form of an annular groove 18 in the outer part 2a, in such a way that the coupling means 17 in the form of a stepped piston 20 can run into the annular groove 18 with little resistance. Retainer rings 23 and 24 fixed in an annular groove 21 of the longitudinal bore 9 and interacting with an axial stop face 22 of the inner part 8 serve to fix this relative position. These retainer rings 23 and 24, explained in more detail below, are congruent, the axial coupling play between an axial drive face 25 of the annular groove 18 and the piston 20 being set by taking the retainer ring 23 in direct contact with the stop face 22 of the inner part 8 from a group of retainer rings of constant thickness and the overlying retainer ring 24 from a type assortment of retainer rings of variable thickness.

Figure 3:
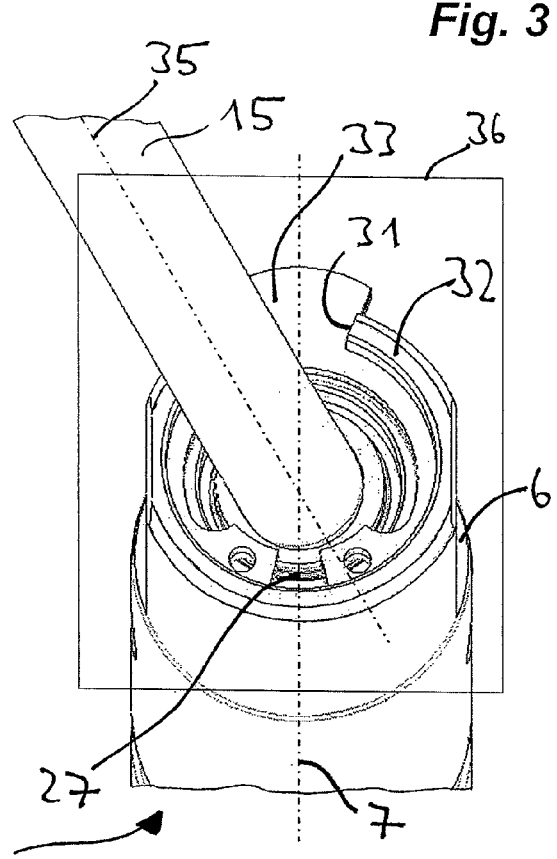
FIG. 3 shows a partial representation of the valve tappet in FIG. 2 in connection with the valve push rod.
Figure 4:
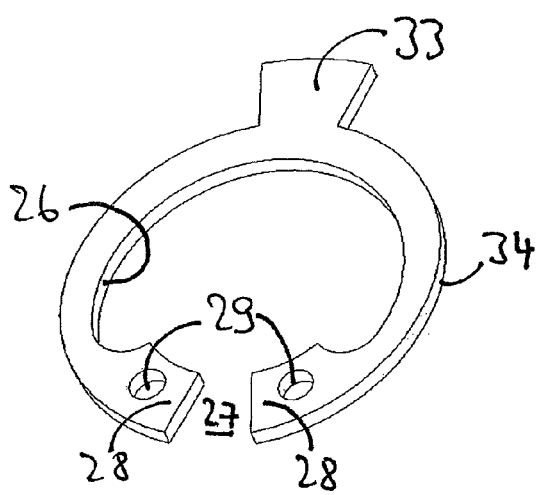
FIG. 4 shows an enlarged, perspective representation of one of the retainer rings intended for the valve tappet according to FIGS. 1 to 3.

FIGS. 2 and 3 respectively show a perspective view of the valve tappet 1 without and with the valve push rod 15. Also visible from these figures is the design of the parallel-spaced key faces 6 of the outer part 2a, by means of which the outer part 2a is secured against torsion about the longitudinal axis 7. In a first design variant of the invention the shape of the retainer rings 23 and 24, one of which is shown enlarged in FIG. 4, is based on retainer rings for bores, which will also be known to the person skilled in the art by the trade name "Seeger ring". On their inner circumference 26 these rings have lugs 28 extending radially inwards and separated by a fitting gap 27, with fitting holes 29, in which an assembly tool can engage for gripping and tightening. In order to allow the valve push rod 15 the requisite free movement in relation to the lugs 28 under all operating conditions, the invention provides for torsional locking means 30a, which fix the radial position of the fitting gap 27 and consequently of the lugs 28 inside the annular groove 21.

In the first design variant of the invention the retainer rings 23 and 24 are each modified so that the torsional locking means 30a comprises a longitudinal groove 31 in the outer part 2a, which proceeding from an end face 32 of the outer part 2a facing the valve push rod 15 intersects the annular groove 21, and a projection 33, which is formed extending radially outwards on the outer circumference 34 of each retainer ring 23 and 24 and radially interlocks in the longitudinal groove 31. In order to avoid having to fit the retainer ring 23 and 24 with reference to an upper side and an underside, the projection 33 is in each case arranged diametrically opposite the fitting gap 27. The longitudinal groove 31, as can be seen from FIG. 3, is aligned radially so that the position of the fitting gap 27 is fixed basically perpendicular to a plane 36 defined by the longitudinal axis 7 of the valve tappet 1 and the longitudinal axis 35 of the valve push rod 15. In the event of kinematically derived swiveling movements of the valve push rod 15, largely occurring in this plane 36, and especially also in the deactivated state of the valve tappet 1, in which the valve push rod 15 together with the inner part 8 sinks into the outer part 2a and in the direction of the retainer rings 23 and 24 is displaced parallel to these, the valve push rod 15 is thereby effectively and permanently prevented from colliding with the comparatively closely separated lugs 28 of the retainer rings 23 and 24. In the example shown, the plane 36 also runs perpendicular to the key faces 6 of the outer part 2a. In this respect the torsional locking means 30a according to FIG. 2, comprising the longitudinal groove 31 and the projections 33, is simultaneously arranged on a middle plane 37 of the outer part 2a, to which the key faces 6 run parallel.

Figure 5:
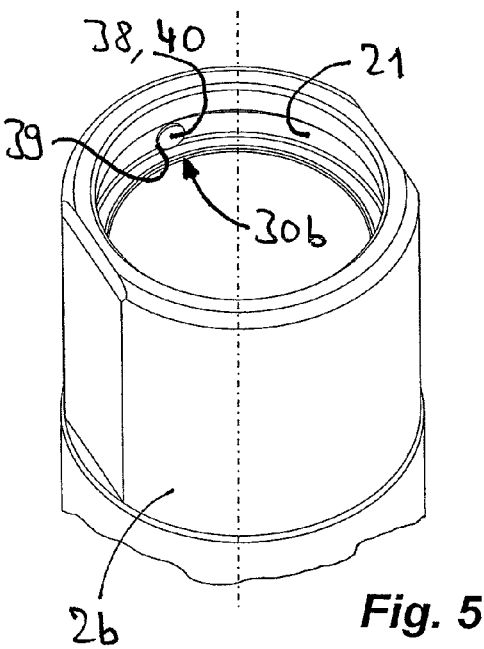
FIG. 5 shows a perspective, partial representation of an outer part of a valve tappet according to a second design variant of the invention.

A second design variant of the invention is explained with reference to a perspective view of a detail of the outer part 2b represented in FIG. 5. In comparison with the preceding embodiments, a torsional locking means 30b for the retainer ring(s) here comprises a torsional locking element 38 projecting radially in the annular groove 21 and running inside the fitting gap 27, said element being fixed by force closure and/or interlock in a transverse hole 39 of the outer part 2b opening into the annular groove 21. The torsional locking element 38 here takes the form of a pin 40, which is pressed into the transverse hole 39 and which runs inside the fitting gap 27 for torsional locking of the retainer ring(s) not shown in this figure. This makes it possible, in this design variant, to use standard commercial retainer rings without the aforementioned projections 33 engaging in the longitudinal groove 31 in the outer part 2a.

Figures 6, 7:
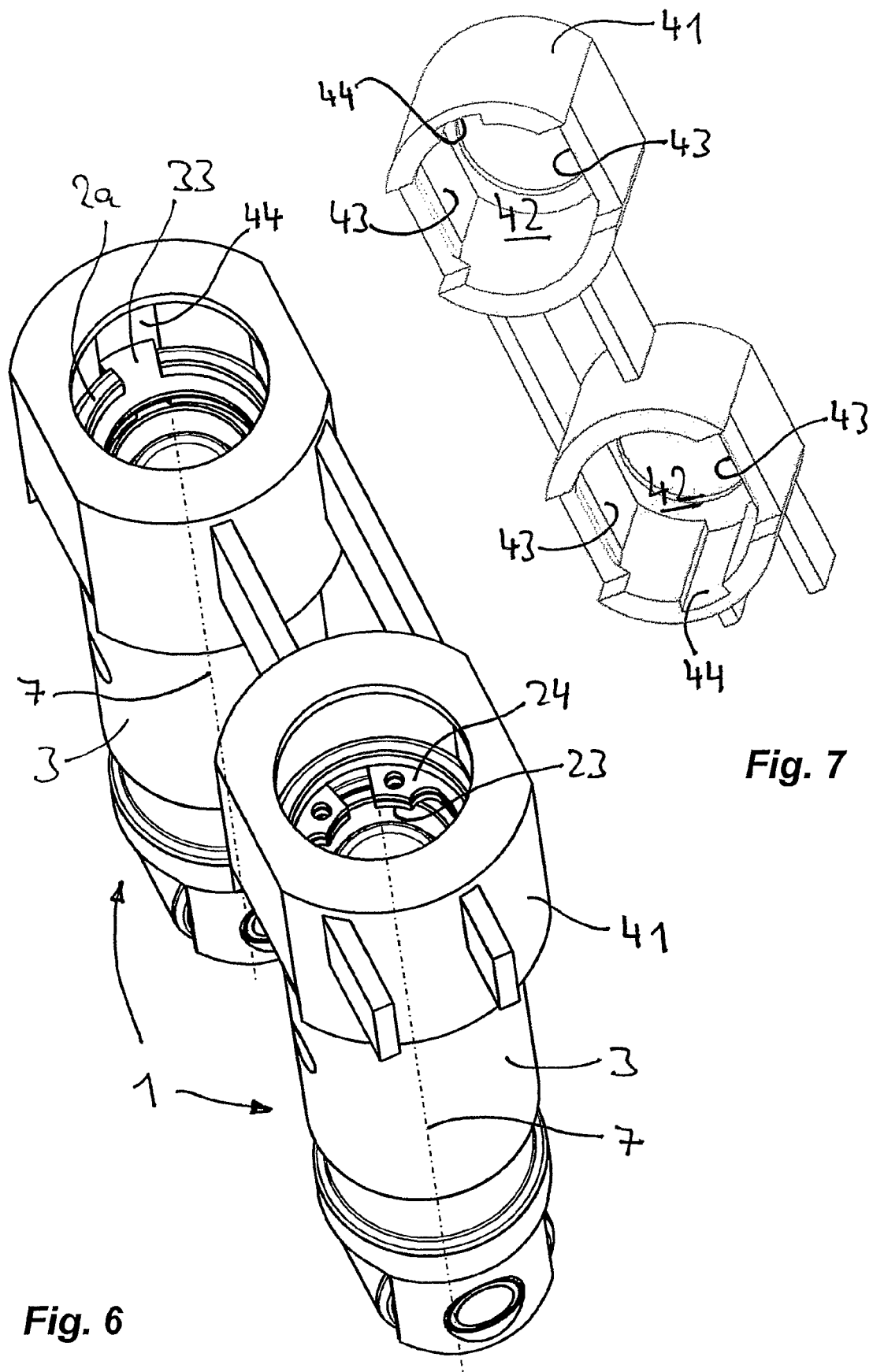
FIG. 6 in a perspective representation shows a detail of a tappet guide track with valve tappets according to FIGS. 1 to 3 fitted therein.
FIG. 7 shows the detail of the tappet guide track in FIG. 6 in a perspective view of locating spaces for the valve tappets.

FIG. 6 represents a section through the center of the tappet guide track 41, which in V8-type internal combustion engines with cylinder cutoff usually forms an assembly unit with two adjustable valve tappets and two conventional valve tappets (not shown here). Although the valve tappets 1 depicted have the modified retainer rings 23 and 24 of the first design variant, the following applies equally well to the second design variant with the torsional locking means 30b described with reference to FIG. 5 in as much as this extends beyond the outer circumferential surface 3 of the outer part 2b.

FIG. 7 shows a perspective view from below of the tappet guide track 41 and locating spaces 42, in which each valve tappet 1 is supported so that it is displaceable in the direction of its longitudinal axis 7 and is secured against torsion about the longitudinal axis 7. For this purpose each locating space 42 has parallel-spaced flats 43 positively interlocking with key faces 6 of the outer part 2a. At the same time the projections 33 of the retainer rings 23 and 24 extending beyond the outer circumferential surface 3 of the outer part 2a engage so that they are longitudinally moveable in a recess 44 running in the locating space 42 in the direction of the longitudinal axis 7 of the valve tappet 1. This serves, on the one hand, to preclude any incorrect fitting of the adjustable valve tappets 1 in locating spaces intended for the conventional valve tappets, in which neither the retainer rings 23 and 24 nor the recesses 44 are required. On the other hand, the unilaterally protruding projections 33 of the retainer rings 23 and 24 forcibly ensure an unambiguously oriented fitting of the valve tappets 1 into their locating spaces 42. This serves to ensure correct orientation of the valve tappets 1 in their tappet guides, for example in relation to separate hydraulic fluid galleries, which serve on the one hand to supply the hydraulic valve clearance adjusting device 13 and on the other for actuation of the coupling means 17.

Such an interaction of the torsional locking means 30a or 30b with the tappet guide track 41 still only represents one option. Since for the required free movement of the valve push rod 15 in relation to the lugs 28 of the retainer rings, it is sufficient merely to fix the radial position of the fitting gap 27 within the annular groove 21. In this respect the projection 33 of each retainer ring 23 and 24 or the pin 40 may be dimensioned so that they do not extend beyond the outer circumferential surface 3 of the outer part 2a or 2b. This also allows the longitudinal groove 31 in the outer part 2a to have a radial depth smaller than the wall thickness, instead of running as a slot over the entire wall thickness of the outer part 2a.

LIST OF REFERENCE NUMERALS

1 Valve tappet
2a,b Outer part

3 Outer circumferential surface
4 Roller
5 Cam follower face
6 Key face
7 Longitudinal axis
8 Inner part
9 Longitudinal bore
10 Lost-motion spring
11 Inner housing
12 Pressure piston
13 Hydraulic valve clearance adjusting device
14 Piston upper part
15 Valve push rod
16 Seat
17 Coupling means
18 Annular groove
19 Seat
20 Piston
21 Annular groove
22 Stop face
23 Retainer ring
24 Retainer ring
25 Drive face
26 Inner circumference
27 Fitting gap
28 Lugs
29 Fitting hole
30a,b Torsional locking means
31 Longitudinal groove
32 End face
33 Projection
34 Outer circumference
35 Longitudinal axis
36 Plane
37 Middle plane
38 Torsional locking element
39 Transverse hole
40 Pin
41 Tappet guide track
42 Locating space
43 Flat
44 Recess

The invention claimed is:

1. A valve train of an internal combustion engine comprising a substantially cylindrical valve tappet, which is adjustable for the variable transmission of a cam lift to a valve push rod inclined in relation to a longitudinal axis of the valve tappet in that the valve tappet has an outer part, secured against torsion about the longitudinal axis and with a cam follower face, an inner part, displaceably supported in a longitudinal bore in the outer part and acting on the valve push rod, and a lost motion spring, which is held inside the longitudinal bore between the outer part and the inner part and which forces the inner part towards an axial position relative to the outer part, in which the inner part and the outer part have seats aligning with one another, one or more coupling elements, displaceable in a direction of the other seat, being arranged in one of the seats for coupling the inner part to the outer part in the relative position, and at least one retainer ring, which is fixed in an annular groove of the longitudinal bore and interacts with an axial stop face of the inner part, being provided for fixing the relative position, said retainer ring on an inner circumference thereof having lugs with fitting holes extending radially inwards and separated by a fitting gap, wherein a free movement of the valve push rod relative to the lugs is assured by the provision of a torsional locking arrangement that fixes a radial position of the fitting gap inside the annular groove, with a position of the fitting gap is fixed basically perpendicular to a plane defined by the longitudinal axis of the valve tappet and a longitudinal axis of the valve push rod.

2. The valve train as claimed in claim 1, wherein the torsional locking arrangement comprises a longitudinal groove in the outer part, which proceeding from an end face of the outer part facing the valve push rod intersects the annular groove, and a projection, formed onto the retainer ring and extending radially outwards from an outer circumference thereof, and interlocking radially in the longitudinal groove.

3. The valve train as claimed in claim 2, wherein the projection of the retainer ring is arranged diametrically opposite the fitting gap.

4. The valve train as claimed in claim 1, wherein two congruent, superimposed retainer rings are fitted into the annular groove the retainer ring in direct contact with the stop face of the inner part being of constant thickness and the overlying retainer ring being of variable thickness.

5. A valve train of an internal combustion engine comprising a substantially cylindrical valve tappet, which is adjustable for the variable transmission of a cam lift to a valve push rod inclined in relation to a longitudinal axis of the valve tappet in that the valve tappet has an outer part, secured against torsion about the longitudinal axis and with a cam follower face, an inner part, displaceably supported in a longitudinal bore in the outer part and acting on the valve push rod, and a lost motion spring, which is held inside the longitudinal bore between the outer part and the inner part and which forces the inner part towards an axial position relative to the outer part, in which the inner part and the outer part have seats aligning with one another, one or more coupling elements, displaceable in a direction of the other seat, being arranged in one of the seats for coupling the inner part to the outer part in the relative position, and at least one retainer ring, which is fixed in an annular groove of the longitudinal bore and interacts with an axial stop face of the inner part, being provided for fixing the relative position, said retainer ring on an inner circumference thereof having lugs with fitting holes extending radially inwards and separated by a fitting gap, wherein a free movement of the valve push rod relative to the lugs is assured by the provision of a torsional locking arrangement that fixes a radial position of the fitting gap inside the annular groove, and the torsional locking arrangement comprises a pin or a rivet, projecting radially in the annular groove and running inside the fitting gap, said torsional locking arrangement being fixed by force closure or interlock in a transverse hole of the outer part opening into the annular groove.

6. A valve train of an internal combustion engine comprising a substantially cylindrical valve tappet, which is adjustable for the variable transmission of a cam lift to a valve push rod inclined in relation to a longitudinal axis of the valve tappet in that the valve tappet has an outer part, secured against torsion about the longitudinal axis and with a cam follower face, an inner part, displaceably supported in a longitudinal bore in the outer part and acting on the valve push rod, and a lost motion spring, which is held inside the longitudinal bore between the outer part and the inner part and which forces the inner part towards an axial position relative to the outer part, in which the inner part and the outer part have seats aligning with one another, one or more coupling elements, displaceable in a direction of the other seat, being arranged in one of the seats for coupling the inner part to the outer part in the relative position, and at least one retainer ring, which is fixed in an annular groove of the longitudinal bore and interacts with an axial stop face of the inner part, being provided for fixing the relative position, said retainer ring on an inner circumference thereof having lugs with fitting holes extending radially inwards and separated by a fitting gap, wherein a free movement of the valve push rod relative to the lugs is assured by the provision of a torsional locking arrangement that fixes a radial position of the fitting gap inside the annular groove, the torsional locking arrangement comprises a longitudinal groove in the outer part, which proceeding from an end face of the outer part facing the valve push rod intersects the annular groove, and a projection, formed onto the retainer ring and extending radially outwards from an outer circumference thereof, and interlocking radially in the longitudinal groove, and the valve tappet is supported in a locating space of a tappet guide track so that it is displaceable in a direction of the longitudinal axis of the valve tappet, said locating space having parallel-spaced flats positively interlocking with key faces of the outer part, the torsional locking arrangement being arranged essentially symmetrically about a middle plane of the outer part, to which middle plane the key faces run parallel.

7. The valve train as claimed in claim 6, wherein the projection of the retainer ring extends beyond an outer circumferential surface of the outer part and engages so that it is longitudinally moveable in a recess of the tappet guide track running in the locating space in the direction of the longitudinal axis of the valve tappet.

\* \* \* \* \*